(No Model.) 3 Sheets—Sheet 1.

LA V. W. NOYES.
VELOCIPEDE.

No. 459,016. Patented Sept. 8, 1891.

Witnesses:
Jean Elliott
Julia Usher

Inventor:
LaVerne W. Noyes
By Burton W. Burton
Attorney.

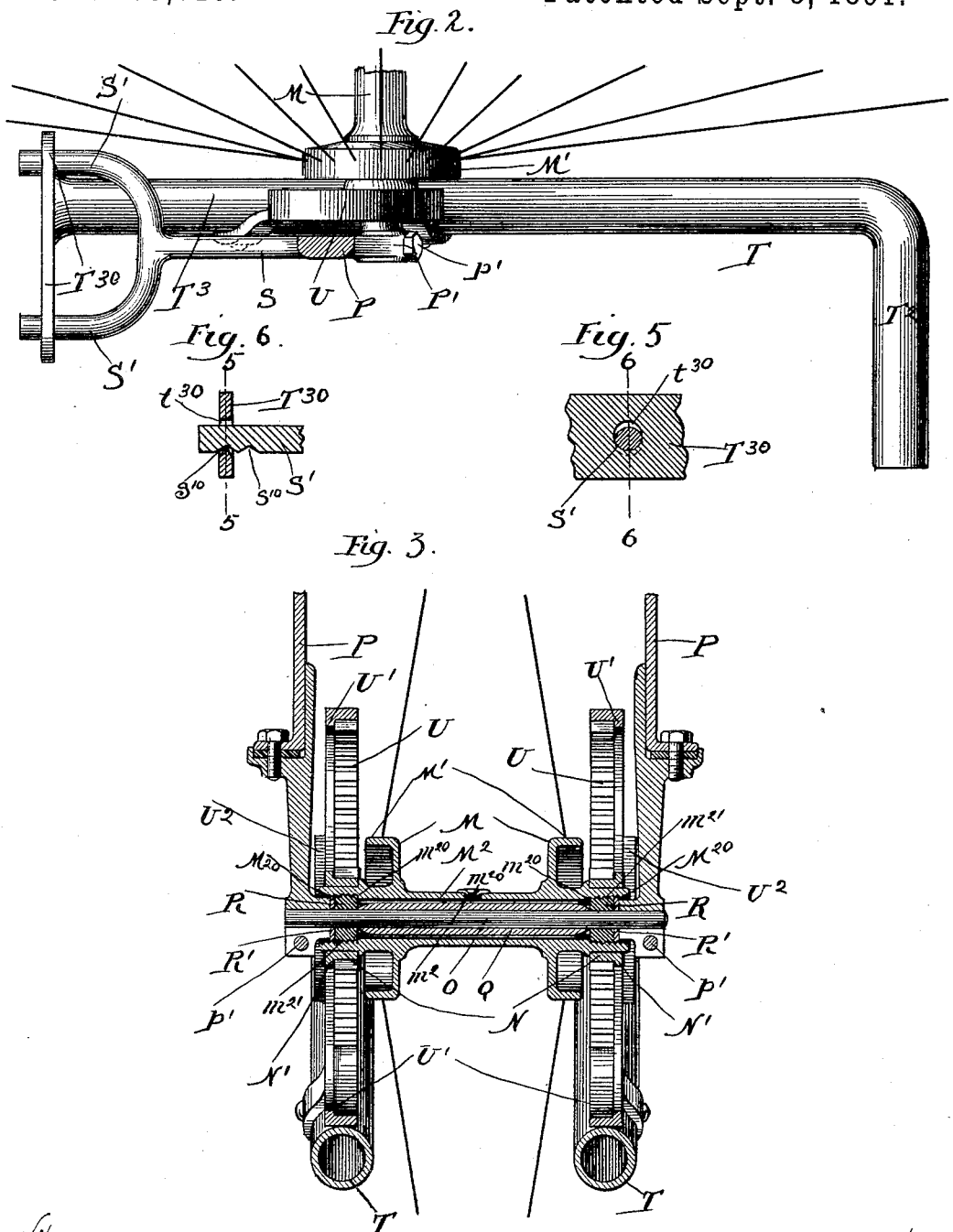

(No Model.) 3 Sheets—Sheet 3.

LA V. W. NOYES.
VELOCIPEDE.

No. 459,016. Patented Sept. 8, 1891.

Witnesses: Jean Elliott, Julia Usler.

Inventor: La Verne W. Noyes
By Burton and Burton
His Attorneys

UNITED STATES PATENT OFFICE.

LA VERNE W. NOYES, OF CHICAGO, ILLINOIS.

VELOCIPEDE.

SPECIFICATION forming part of Letters Patent No. 459,016, dated September 8, 1891.

Application filed January 5, 1891. Serial No. 376,751. (No model.)

*To all whom it may concern:*

Be it known that I, LA VERNE W. NOYES, a citizen of the United States, residing at Chicago, county of Cook, and State of Illinois, have invented certain new and useful Improvements in Velocipede-Driving Mechanism, which is set forth in the following specification, reference being had to the accompanying drawings, forming a part thereof.

The purpose of this invention is to provide novel means for communicating the power of the rider from the pedal to the drive-wheel of a velocipede and to provide a novel bearing for velocipedes, such bearing being herein shown specifically as applied to the drive-wheel, but being in its general features adapted to other journal-bearings of velocipedes.

Figure 1:
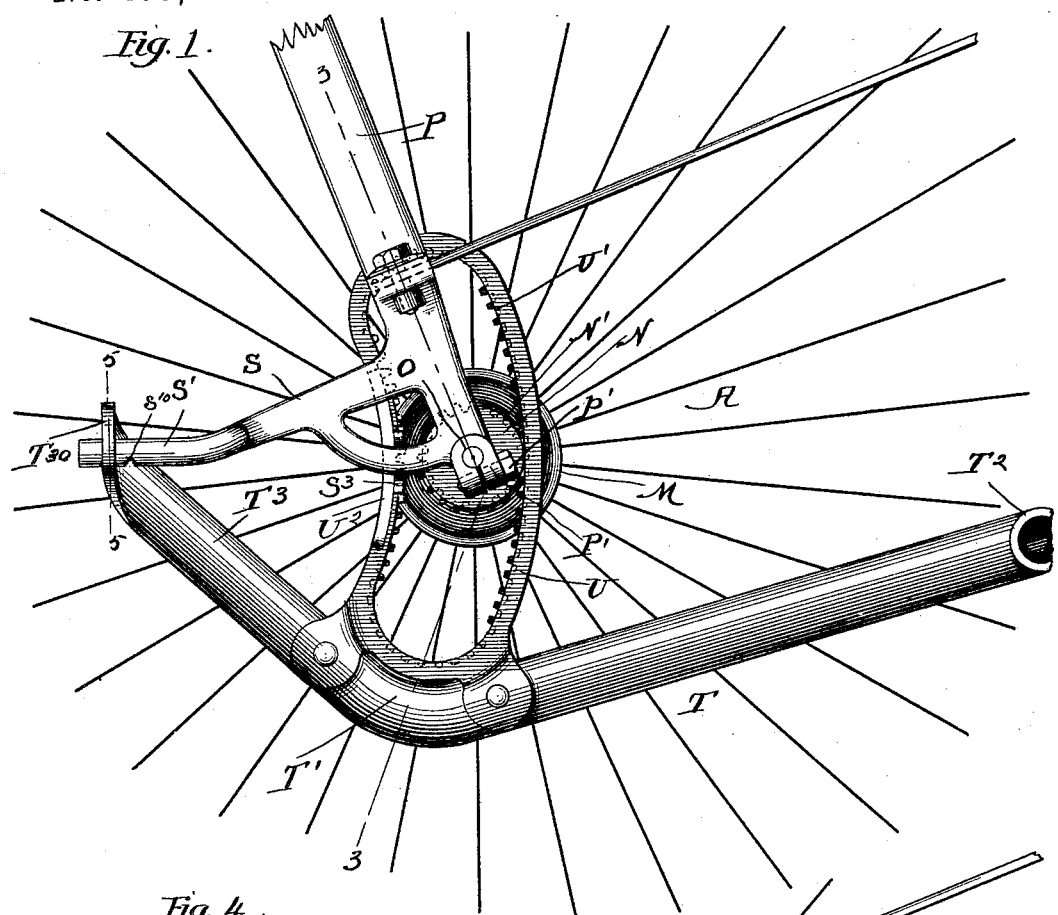
Figure 4:
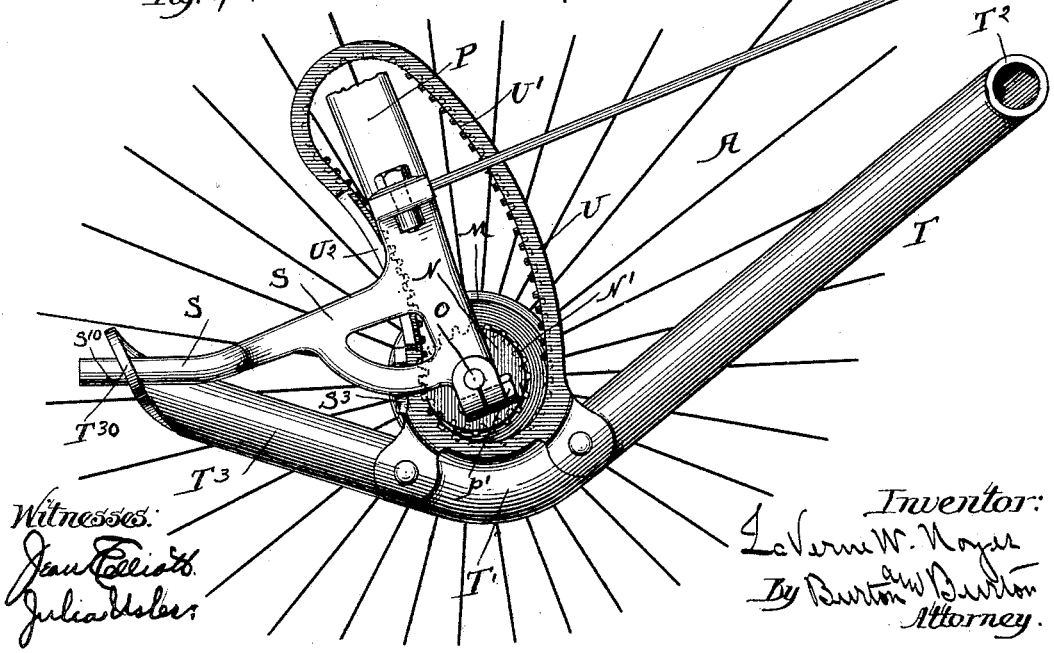
Figure 7:
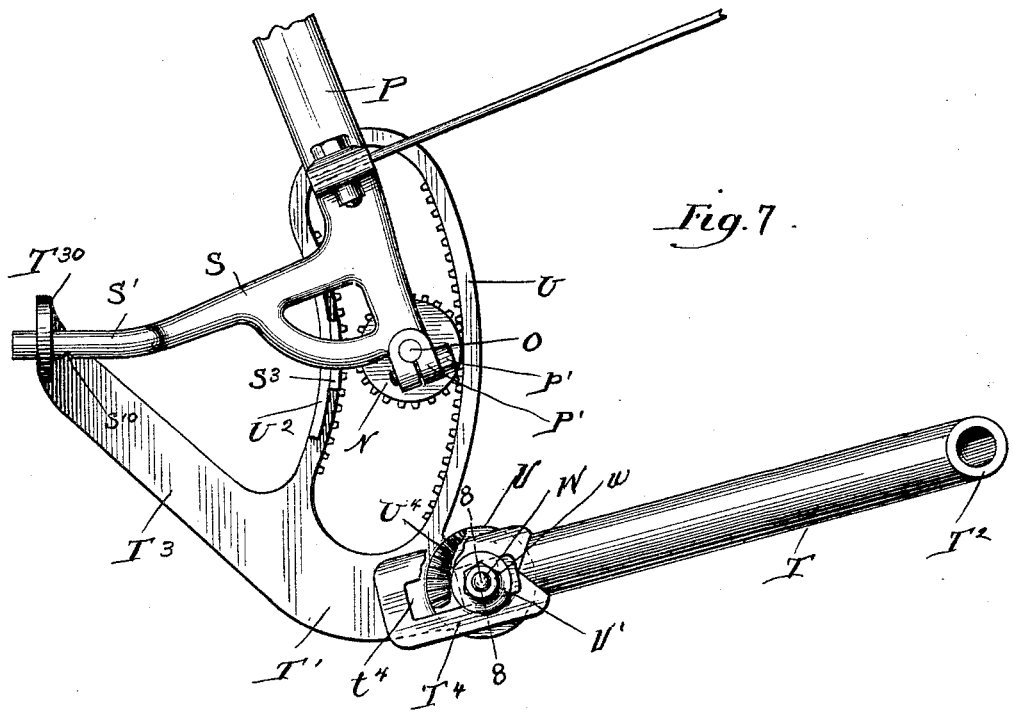
Figure 8:
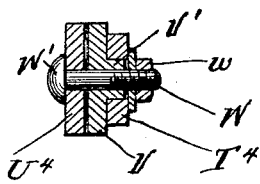

In the drawings, Figure 1 is a side elevation of the drive-wheel, driving mechanism, and portion of a frame of a velocipede embodying my invention. Fig. 2 is a sectional plan of the same parts, the wheel being broken away and the fork being shown in section above the parts peculiar to the driving mechanism. Fig. 3 is a section at the plane indicated by the line 3 3 on Fig. 1. Fig. 4 is a detail side elevation similar to Fig. 1, but whereas Fig. 1 shows the parts in the position occupied when the pedal is descending Fig. 4 shows the position occupied when the pedal is ascending. Fig. 5 is a detail section at the line 5 5 on Fig. 1. Fig. 6 is a detail section at the line 6 6 on Fig. 5. Fig. 7 is a detail side elevation of the pedal-lever and connections, showing a means of adjusting the length and height of the pedal. Fig. 8 is a section at 8 8 on Fig. 7.

A is the drive-wheel. The construction of the hub M in detail is hereinafter set forth and constitutes the second part of this invention.

N N are the pinions, which are made rigid with the hub at its opposite ends, respectively.

P P are the arms of the fork, which stride the wheel and constitute what may be termed the "drive-wheel frame."

O is the axle, which is inserted through the hub of the wheel, the latter turning freely thereon, the bearings being constructed as hereinafter described and the ends of the axle being made fast in the ends of the fork-arms P P, said fork-arms having at their ends the split journal-boxes P' P', adapted to be clamped together by the bolts $p'$ after the axle is inserted, to make the axle rigid with the fork-arms.

Rearward from the fork-arms, respectively, there is extended on each side of the wheel a bracket S, which at its rear end is horizontally forked, the two arms S' S' being horizontally separated at their rear ends a distance of from two to three inches to afford a broad fulcrum for the pedal-levers T T, which are fulcrumed on said arms S' S', as hereinafter described. The pedal-levers T T may be of any convenient material, and preferably, as illustrated, they are of tubular metal for lightness and stiffness. These levers are bent downward at T' at a distance from their rear fulcrum about equal to the distance of said fulcrum from the axle, being also about one-third of their entire length from the fulcrum to the pedal-bearing. At this bend there is secured to each a segment-rack U, which projects upward from the bend rigidly, said segment-racks being curved about centers in the line of the fulcrum of the pedal-levers, and having gear-teeth all around their inner periphery, which are adapted to mesh with the pinions N N, which are thus encircled by the segment-racks, respectively, the distance between the concave and convex sides of said racks—measuring from point to point of the opposite teeth—being just sufficient to permit the pinions to clear the teeth on both sides at once. At the forward end the pedal-levers have pedal-bearings $T^2$, adapted to any desired form of pedal. At the rear of the shorter arm $T^3$ of the pedal-lever it is expanded transversely in the flanges or lugs $T^{30}$. These flanges have the apertures $t^{30}$ $t^{30}$, which receive the ends of the arms S', whereby the pedal-levers are hung on said arms and are adapted to slide thereon slightly, as hereinafter explained. The lower edges of the apertures $t^{30}$ are V-shaped or approximately knife-edges, as seen in Fig. 6, and the arms S' S' have each on the under side two notches $s^{10}$ $s^{10}$, and said V-shaped edges lodge during the downstroke in one of said notches and in the other during the upstroke, as hereinafter explained, and the levers are thus afforded exact pivot-bearings, whereby the flanges hereinafter mentioned, which prevent disengagement of the pinions and racks to a large extent, are relieved of friction upon each other.

The pinions N N have each an exterior marginal flange N', whose periphery is in the pitch-line of the teeth, and the segment-racks U have a corresponding flange U', also in the pitch-line of the rack-teeth, so that as the pinion travels in the rack the pitch-line flanges N' roll on the flanges $N^2$, and said flanges together thus control the depth of mesh of the pinions in the racks. In addition to these flanges U' each segment has on its rear or concave side and outer face the flange $U^2$, located at the middle portion of the segment and extending a distance toward each end, which may be varied correspondingly with the length of a certain flange or lug $S^3$, which projects from the bracket S inward toward the face of the segment in such position that when the pinion is meshed in the forward or concave side of the segment-rack said flange $S^3$ stands forward of the flange $U^2$, lapping past it, and preventing the pinions from escaping out of mesh with the racks until, by the movement of the segment downward, the upper end of the flange $U^2$ passes the lower end of the lug $S^3$, the said flange and lug being so extended relatively that this will occur when the upper end of the segment-rack reaches the pinion—that is, when the pinion is about to roll around the upper end of the rack, or, more correctly speaking, when the upper end of the rack is about to roll around on the pinion, (because the axis of the pinion is stationary, while the rack is the moving part.) This movement of the rack, which occurs while the pinion is meshing with the end portion, carries the flange $U^2$ forward past the end of the lug $S^3$, the width of each of said lugs being equal to the excess of the width of the segment, measuring from the points of the teeth on opposite sides, over the diameter of the pinion, measuring from the points of opposite teeth, which, as above indicated, is barely more than the entire height of the teeth. When, therefore, the pinion has passed around the end of the segment and is meshed with the convex portion of the rack on the rear side, the flange $U^2$ is in position to pass up on the forward side of the lug $S^3$, and the engagement of this pinion and lug will now hold the pinion in mesh with the convex or rear side of the rack while the rack is rising with the pedal, as it was held in mesh with the forward side of the rack while the pedal and rack were descending. In this shifting of the position of the segment, carrying its forward rack out of mesh and its rear rack into mesh with the pinion, the pedal-lever will slide at its fulcrumed end on the arms S' S', the knife-edge of the apertures $t^{30}$ passing out of one of the notches $s^{10}$ into the other of said notches. At the opposite limit of the stroke the lever and racks will shift in the opposite direction in a manner precisely similar to that just described. The natural pressure of the foot and the weight of the levers would tend to cause them to shift, as stated, even without the engagement of the pinion in the ends of the racks, but this engagement insures it, and the notches $s^{10} s^{10}$ cause the levers to fulcrum at those exact points, and make it possible to construct the flange $U^2$ and the lug $S^3$ so that no appreciable friction will occur between them—that is, in the ordinary action they may not actually touch—but in case any jolt or other irregularity of action should tend to throw the pinion out of mesh with the rack they serve as a safeguard and positive preventive of such result. The parts are assembled with one of the pinions meshed at the middle point of the forward or concave side of the rack and the other pinion meshed at the middle point of the rear or convex side of its rack, so that the pedal whose rack is meshed at the forward or concave side with its pinion is in position to be depressed, thereby communicating power to the drive-wheel and causing the other pedal and rack to rise. The greater length of the forward or concave rack by reason of its greater radius or distance from the fulcrum adapts it to have more teeth than the rear or convex rack, said racks having in the drawings twenty and fourteen teeth, respectively. Both the pinions, however, being rigid with the same wheel and revolving together, the downward stroke of one pedal revolving the pinion from the middle point ten teeth, which, as illustrated, is half a revolution of the pinion, will cause the opposite pinion to carry its rack up the seven teeth which constitute the lower half of the smaller rack and revolving one tooth farther will shift the rack while the pinion rolls in the lower end, and during the remainder of the half-revolution will carry the rack down two teeth, so that when the downstroke of one pedal is reached the upstroke of the other has been completed and its downstroke proceeded two teeth's distance. The gain the descending pedal thus makes over the ascending pedal is compensated in the remainder of the revolution by a corresponding gain in the other pedal which has begun to descend and corresponding loss of the pedal which first descended, so that at the middle point of the stroke of each they are again meshed, each at the middle of the rack with which it is engaged. This construction, therefore, prevents any "dead-center" in the action of the pedals, the stage at which that would commonly occur—that is, the stage at which the rising pedal passes over into active position and is prepared to descend—being the stage at which both pedals are active, both being on the descent, so that pressure upon either will continue the motion. The rack and pinion are made of such size relatively that the downstroke of each pedal gives one complete revolution to the wheel—that is, each complete reciprocation of the pedal corresponds to two revolutions of the wheel, the effect being that which is produced by any ordinary chain-drive, in which the driving sprocket-wheel is twice the size of the driven sprocket-wheel. It will be understood, of course, that any desired ratio may be established instead of this.

In this machine I employ a bearing made of rawhide, which I will now describe. This part of my invention is not limited in its application to the wheel-bearing, but may be applied in its general features to any bearing.

The wheel-hub M, having the usual flanges M' M', to which the spokes are connected, is tubular throughout, the cavity $M^2$ being enlarged at the end portions $M^{20}$, leaving annular stop-shoulders $m^{20}$ at the bottom of such enlargements, and being preferably threaded in said enlarged portions, such threads being shown at $m^{21}$ $m^{21}$. The pinions N N are secured to the hub outside the spoke-flanges N' N' and most conveniently so secured upon the portion of the hub within which are the enlarged cavities $M^2$ $M^2$. The pinions may be made rigid with the hub in any desired manner, as by being driven on tight or being secured by brazing or other convenient means.

The axle O, secured, as above described, to the fork ends, is preferably made of steel rod.

Q is a sleeve which is made to fit closely on the axle O. It is designed to be placed thereon before the latter is passed through the hub of the wheel, and its length is equal to the distance between the shoulders $m^{20}$ $m^{20}$. The tubular cavity through the axle is greater in diameter than the sleeve Q, so that space is left all around the sleeve in said cavity $M^2$ after the axle is in place in the center of the cavity, where it is held by being journaled in the rawhide bearings R R, which are driven or screwed tight into the cavities $M^{20}$ $M^{20}$ against the stop-shoulders $m^{20}$ $m^{20}$. These rawhide bearings may be thus forced into their seats after the axle with the sleeve Q upon it is passed through the hub and before the ends of the forks are clamped onto the axle ends, or the sleeve may be put into the hub and the rawhide bearings afterward forced into their seats in the cavities $M^2$ $M^2$, and the fork ends being brought into position the axle may be inserted and driven through from one side, being entered first into the eye of the fork and on that side and forced on through the rawhide bearing at that side into and through the sleeve Q, and thence through the other bearing and into the eye of the other fork end. Preferably, however, the sleeve should fit tightly on the axle to make this latter mode of inserting it convenient, and the fork may readily be made capable of springing apart far enough to allow the ends to be passed onto the opposite ends of the axle after it has been put into place in the manner first described. Washers R' R' are preferably put onto the axle outside of the rawhide bearings, said washers being large enough to close the end of the cavity $M^2$, and thereby tending to exclude moisture from the rawhide; but the hubs of the fork-arms may themselves directly close the cavities and the washers R' serve only the usual purpose of preventing the friction between the rawhide bearings and hubs of the forks. The cavity $M^2$ is thus forked at both ends by the rawhide bearings and forms around the sleeve Q an oil-chamber, which may be supplied with oil through the holes $m^2$, closed by the screw-plug $m^{20}$. The ends of the sleeve Q are rounded or tapered, and, extending to the inner ends of the rawhide bearings, they conduct the oil to the bearings as the wheel revolves. The rawhide bearings are thus lubricated and kept saturated with oil, which excludes moisture, which would tend to swell the bearings and cause them to bind the axle. In case of damage to these rawhide bearings or their becoming inefficient through use, they can be very readily and very cheaply replaced, the fork-arms being sprung off from the axle and either of the rawhides alone being removed or the entire axle-sleeve and rawhides being removed together and new outfits substituted.

An important purpose of the structure of the axle and its bearings, which are above described, is that it permits the employment of a slender steel rod for the axle, so making the bearing-surface and the friction very small, while at the same time affording an axle of the best quality and best temper for wear, and at the same time as stiff as it would be if it were of the full diameter of the sleeve between the bearings, because the sleeve, fitting closely upon the axle-rod, stiffens it as effectually as if it were a part of it, while the cost of construction is diminished much below that of a solid steel axle of the same form— that is, with the enlargement which the sleeve makes. It will be obvious that this feature of construction may be employed whatever be the material of which the bearings R R are composed.

It may be found desirable to make the pedal-lever adjustable both as to length and as to the height of the pedal, and a construction for that purpose is shown in Figs. 7 and 8. In these figures the segment is shown integral with the shorter arm of the pedal-lever, and the longer arm of the lever is connected thereto by means which render it adjustable longitudinally and also pivotally, the longitudinal adjustment varying the length or distance of the pedal from the fulcrum and the pivotal adjustment varying the height of the pedal relatively to the seat. In detail the construction illustrated in these figures is that at the lower rear corner of the segment there is formed a lug $U^4$, serrated radially on its outer face and pierced at the center to receive a clamping-bolt.

V is a disk which is correspondingly serrated and pierced and which has a rectangular hub V' projecting from its outer side. The pedal-lever longer arm has a flattened end T⁴, which has the longitudinal slot $t^4$, in which the hub V' of the disk V fits closely and is adapted to slide.

W is a clamping-bolt, which is inserted through the pierced disks and is provided with a nut $w$, between which and the head W' of the bolt the other parts mentioned are clamped, and thereby the pedal-lever is secured in whatever position it may be adjusted, the position of the hub V' in the slot fixing the longitudinal position and the engagement of the radially-serrated disks with each other fixing the height of the pedal.

I claim—

1. In a velocipede, in combination with the driving-wheel frame or fork and the driving-wheel journaled therein, equal pinions on opposite sides of the wheel rigid therewith at the center, pedal-levers pivoted to the frame on fulcrums removed from the axle, one on each side of the wheel, and the interiorly-cogged segments U, rigid with the pedal-levers, respectively, and adapted to mesh therewith, substantially as and for the purpose set forth.

2. In a velocipede, in combination with the driving-wheel fork or frame, a driving-wheel journaled therein, pinions one on each side of the wheel at the center thereof and rigid therewith, the pedal-levers, one on each side of the wheel, fulcrumed on the frame at a distance from the axle adapted to oscillate vertically, interiorly-cogged segments rigid with the pedal-levers, respectively, said pedal-levers being adapted to shift their fulcrums on the frame toward and from the pinions when the pinions are at the ends of the segments a distance sufficient to carry the segments out of mesh with one side and into mesh with the other, substantially as set forth.

3. In a velocipede, in combination with the driving-wheel fork or frame and the driving-wheel journaled therein, pinions rigid with the wheel on opposite sides thereof, pedal-levers fulcrumed on the frame at a distance from the axle, interiorly-cogged segments rigid with the pedal-levers, respectively, encircling and meshing with the pinions, respectively, the pedal-levers being adapted to shift their fulcrums on the frame toward and from the pinions, co-operating segmental guides U² and S³ on the segments and on the frame, respectively, the thickness of both being equal to the distance necessary to shift the pinions to carry them out of mesh with the teeth on one side of the segment and into mesh with those on the opposite side, said guides being in position to clear each other when the pinions are at the ends of the segments, substantially as set forth.

4. In combination with the frame, the pedal-levers fulcrumed thereon, segments cogged in two arcs and carried by said levers, respectively, the drive-wheel and the pinions through which it receives motion, said pinions meshing, respectively, with said cogged segments, and the levers having shifting fulcrums, whereby the two cogged arcs of each segment may be alternately engaged with the respective pinions, substantially as set forth.

5. In a velocipede, in combination with the frame, pedal-levers fulcrumed thereon, cogged segments carried by said levers, respectively, the drive-wheel and pinions through which it receives motion, said pinions meshing, respectively, with said cogged segments, said segments being each cogged in two arcs of unequal number of teeth, and the levers having shifting fulcrums, whereby the wheel receives unequal amount of motion from the two arcs, respectively, substantially as set forth.

6. In a velocipede, in combination with the wheel-hub tubular throughout, an axle adapted to be inserted through said tubular hub and having the sleeve Q fitting tightly upon it between its ends, and the bearing-pieces R R for said axle, secured in the hub near the ends of the tubular opening therethrough and at the ends of said sleeve, substantially as set forth.

7. In combination with the wheel-hub having the axial cavity M², said cavity having the end enlargements M²⁰, forming the shoulders $m^{20}$, the axle having the sleeve thereon inserted through such cavity, and the bearing-pieces R R, made fast in the ends of the cavity against the shoulders $m^{20}$ and abutting upon the ends of the sleeve, substantially as set forth.

8. In a velocipede, in combination with the wheel-hub having the axial cavity M², the axle having the sleeve thereon inserted through such cavity, the bearing-pieces R R, made fast in the ends of the cavity, the sleeve being of less diameter than the cavity, whereby an oil-chamber is formed in the hub around the sleeve and in which said sleeve serves to conduct the oil to the bearing-pieces, substantially as set forth.

9. In combination with the wheel-hub having the axial cavity M², the axle having the sleeve thereon inserted through such cavity, and the bearing-pieces made fast in the ends of the cavity, the sleeve being of less diameter than the cavity and being further diminished in diameter toward its ends, substantially as and for the purpose set forth.

In testimony whereof I have hereunto set my hand in the presence of two witnesses.

LA VERNE W. NOYES.

Witnesses:
RINA E. DAVIS,
E. HART.